(12) United States Patent
Winkler et al.

(10) Patent No.: US 8,882,383 B2
(45) Date of Patent: Nov. 11, 2014

(54) FASTENING DEVICE FOR AN AIRCRAFT INTERIOR EQUIPMENT COMPONENT

(75) Inventors: Johannes Winkler, Staig (DE); Andreas Becker, Blaustein (DE)

(73) Assignee: Airbus Operations GmbH (DE)

( * ) Notice: Subject to any disclaimer, the term of this patent is extended or adjusted under 35 U.S.C. 154(b) by 589 days.

(21) Appl. No.: 12/472,127

(22) Filed: May 26, 2009

(65) Prior Publication Data

US 2009/0294592 A1 Dec. 3, 2009

Related U.S. Application Data

(60) Provisional application No. 61/056,132, filed on May 27, 2008.

(30) Foreign Application Priority Data

May 27, 2008 (DE) .......................... 10 2008 025 230

(51) Int. Cl.
*B25G 3/00* (2006.01)
*B64D 11/00* (2006.01)
*F16B 21/09* (2006.01)

(52) U.S. Cl.
CPC ............ *B64D 11/0007* (2013.01); *F16B 21/09* (2013.01)
USPC ....................................... 403/350; 244/118.1

(58) Field of Classification Search
USPC ............... 403/348, 349, 350, 353; 244/118.1, 244/118.5
See application file for complete search history.

(56) References Cited

U.S. PATENT DOCUMENTS

| 3,032,281 | A | * | 5/1962 | Wexell | 241/92 |
| 3,298,350 | A | * | 1/1967 | Mundschenk | 116/332 |
| 4,361,286 | A | * | 11/1982 | Hofmann et al. | 239/453 |
| 4,787,602 | A | * | 11/1988 | Pidgeon | 256/23 |
| 5,172,601 | A | * | 12/1992 | Siegrist et al. | 74/89.36 |
| 5,284,399 | A | * | 2/1994 | Brustle et al. | 403/199 |
| 5,427,485 | A | * | 6/1995 | Henderson et al. | 410/26 |
| 5,494,341 | A | * | 2/1996 | Cheng | 301/111.06 |
| 5,620,120 | A | * | 4/1997 | Tien | 224/199 |
| 5,906,031 | A | * | 5/1999 | Jensen | 24/3.12 |
| 7,090,700 | B2 | * | 8/2006 | Curtis | 623/38 |
| 7,128,295 | B2 | * | 10/2006 | Scown | 244/118.1 |
| 7,601,004 | B2 | * | 10/2009 | Lamoree et al. | 439/11 |
| 2008/0112754 | A1 | * | 5/2008 | Schmitz et al. | 403/350 |

FOREIGN PATENT DOCUMENTS

| DE | 1735025 | 11/1956 |
| DE | 2136921.1 | 2/1973 |
| DE | 904721 | 5/2009 |
| GB | 530855 | 12/1940 |
| GB | 556741 | 10/1943 |

\* cited by examiner

Primary Examiner — Michael P Ferguson
Assistant Examiner — Daniel Wiley
(74) Attorney, Agent, or Firm — Barnes & Thornburg LLP

(57) ABSTRACT

A fastening device is provided for an aircraft interior equipment component, with at least one suspension point which is formed to transmit forces to a holding structure in at least one direction. In order to install the aircraft interior equipment components quickly and without tools, each suspension point is formed by a rotatable sliding block and a groove, wherein the groove has a transverse dimension as well as a first open end and a second end which leads into a circular recess. The sliding block also has a transverse dimension which is smaller than or equal to the transverse dimension of the groove and a longitudinal dimension which is greater than the transverse dimension of the groove, so that the sliding block can be positively locked by a rotation thereof in the circular recess.

13 Claims, 3 Drawing Sheets

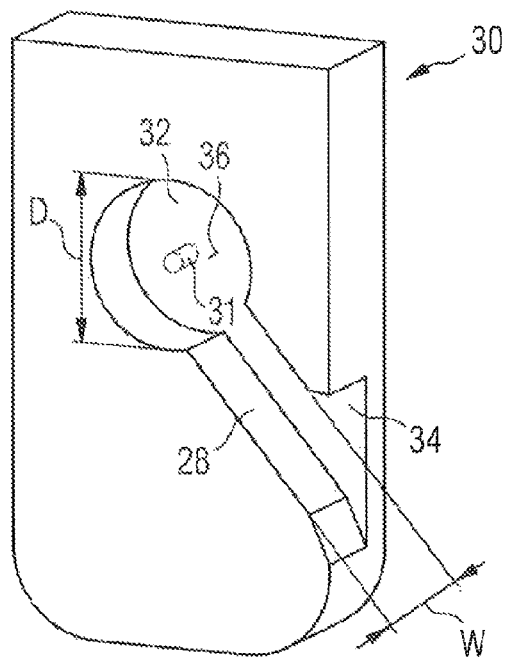
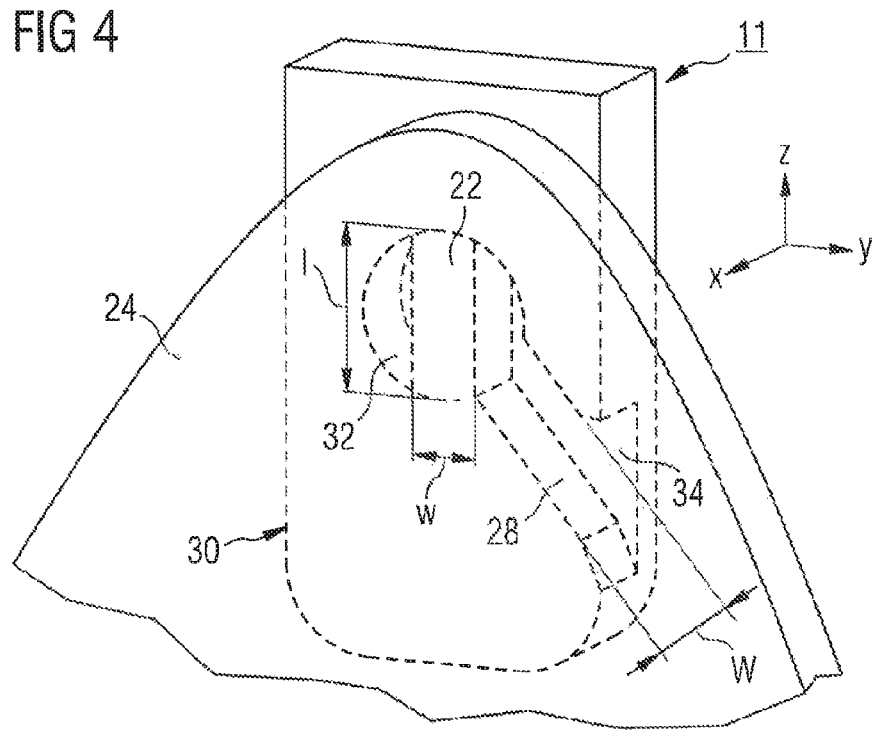

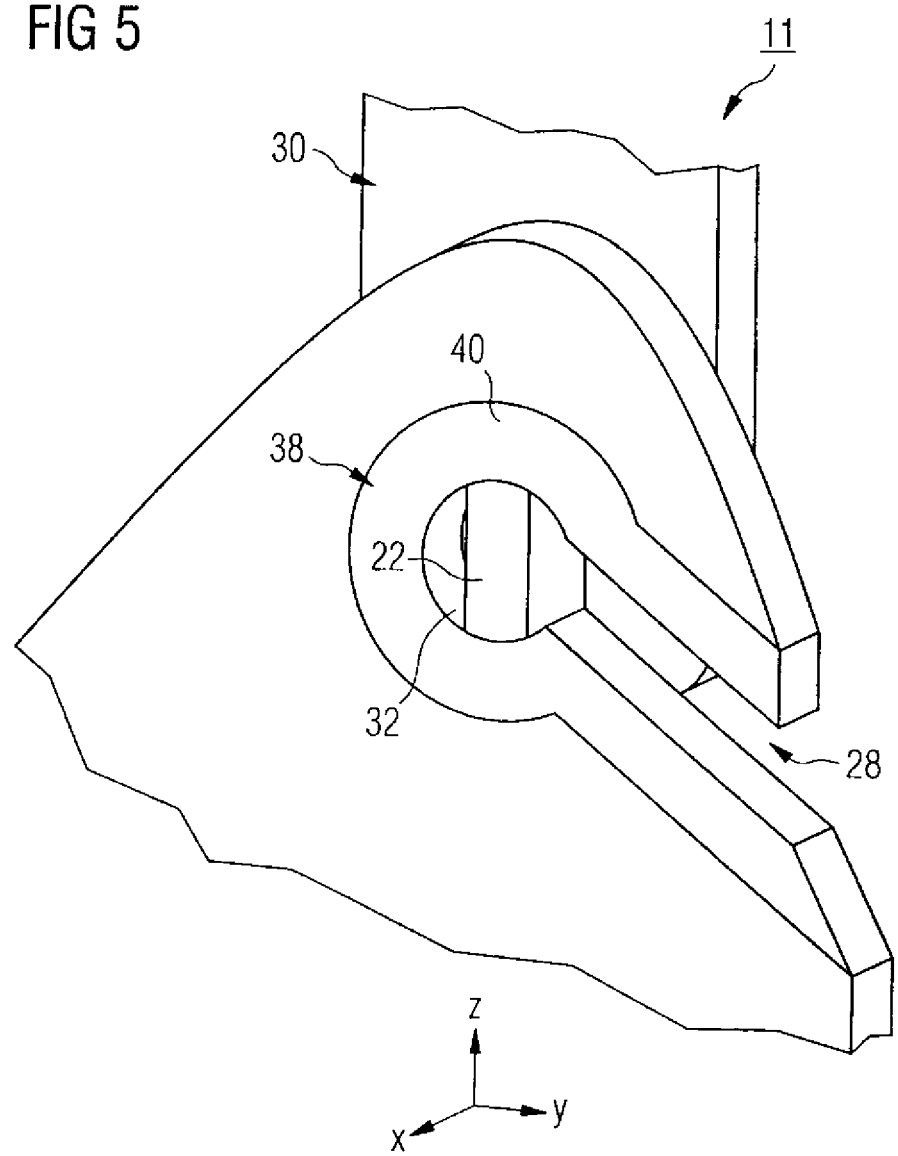

FASTENING DEVICE FOR AN AIRCRAFT INTERIOR EQUIPMENT COMPONENT

CROSS-REFERENCE TO RELATED APPLICATION

This application claims priority to U.S. Provisional Patent Application No. 61/056,132 filed May 27, 2008 and German Patent Application No. 10 2008 025 230.1, filed May 27, 2008, which is incorporated by reference herein in its entirety.

The present invention relates to a fastening device for the interior finishing of cabins in means of transport, in particular a fastening device for an aircraft interior equipment component.

The interior equipment of an aircraft cabin is subject to special requirements. For example, the number of components should be kept as small as possible in order to minimise the empty weight of the aircraft. Furthermore, it is desirable to reduce the number of mounting steps for efficient assembly. In addition, a reduction of the assembly time is desired.

A further aspect is the dimensioning of a fastening device for an aircraft interior equipment component. For example, luggage rack systems which can be lowered in passenger aircraft must be fastened to the aircraft structure. These luggage rack compartments are mounted in an overhead position in the longitudinal direction of the aircraft. The fastening device for a luggage rack compartment must be able to transmit the inertial forces of a fully loaded luggage rack compartment to the aircraft structure, even in extreme situations, such as a crash landing of the aircraft. On account of the overhead position of the luggage rack compartment, breakage of the fastening device, for example in the case of a hard landing, would mean a significant risk of injury for the passengers seated underneath. For this reason fastening devices for aircraft interior equipment components are designed to transmit forces of up to 10,000 N, for example.

Luggage rack compartments are connected to the aircraft structure in the centre of the cabin or, as lateral luggage rack compartments, at the outer sides of the aircraft cabin. Lateral luggage rack compartments which are connected to the aircraft structure at five points are known. In this case separate connection points are responsible for transmitting forces for longitudinal and transverse directions. One connection point is provided for loads in the longitudinal direction of the aircraft and four further connection points are provided for loads perpendicular to the longitudinal direction of the aircraft. The connections to the structure are achieved either directly via a respective bolt and a respective locking element or indirectly via tension/compression rods which are assembled with bolts and locking elements.

The assembly of an aircraft interior equipment component of this kind is very time-consuming, as many loose individual parts, which have to be manually assembled, are required for the fastening. The handling of predominantly bulky aircraft interior equipment components is complicated, as the aircraft interior equipment component has to be held very accurately in position while inserting the bolts in receptacles at the connection points. There is therefore a need for an overall improved assembly system for highly loaded interior equipment components, such as, for example, luggage rack compartments.

The object of the present invention is to take remedial measures here.

This object is achieved according to the invention by a fastening device for an aircraft interior equipment component having the features of Claim 1. The suspension point is accordingly formed to transmit forces to a holding structure of the aircraft in at least one direction. The suspension point is formed by a rotatable sliding block and a groove. It is possible to dispense with all loose components according to the invention. The groove has a first open end and a second end which leads into a circular recess. The sliding block has a transverse dimension which is smaller than or equal to a transverse dimension of the groove. The sliding block also has a longitudinal dimension which is greater than the transverse dimension of the groove, so that the sliding block can be positively locked by a rotation in the circular recess.

On account of the transverse dimension of the sliding block, which is smaller than or at most equal to the transverse dimension of the groove, the sliding block can be introduced into the groove at the first open end and moved along the groove up to the second end into the circular recess. As a result of rotating the sliding block in the circular recess and its relatively large transverse dimension, the sliding block is arrested in the circular recess.

In this respect the rotation of the sliding block can take place separately, for example by rotatably mounting the sliding block in the aircraft interior equipment component or the holding structure. As an alternative to this, the sliding block can be firmly connected to a further part, for example the aircraft interior equipment component, so that the sliding block and the aircraft interior equipment component must be rotated together.

According to a first embodiment, the groove is applied to the holding structure and the sliding block to the aircraft interior equipment component. The sliding block can be fastened to the aircraft interior equipment component in an immobile manner, so that the rotation of the sliding block in the circular recess is achieved by a pivotal movement of the entire aircraft interior equipment component. The combination of positioning and subsequent pivotal movement of the aircraft interior equipment component, which results from an embodiment of this kind, can be used to further accelerate the assembly of the aircraft interior equipment component.

In another embodiment the sliding block is applied to the holding structure and the groove to the aircraft interior equipment component. This enables the production of the aircraft interior equipment component to be simplified. Furthermore, it is conceivable to assemble aircraft interior equipment components of this embodiment together with those of the abovementioned first embodiment inside an aircraft cabin, whereby risks of confusion during assembly, for example, are excluded on account of the different constructions of the fastening device. The fastening device according to the invention can in this way at the same time serve as a mechanical assembly coding.

According to a further aspect, the longitudinal dimension of the sliding block can correspond to the diameter of the circular recess. This makes it possible to positively lock the aircraft interior equipment component without play. Furthermore, the ends of the sliding block can be rounded, in which case the rounding radius can correspond to the radius of curvature of the circular recess. As a result, the ends of the sliding block can completely abut in the circular recess, whereby the surface pressure is minimised. The rounding radius can alternatively be selected so as to be smaller than the radius of curvature of the circular recess. This enables, for example, catching of the sliding block in the circular recess during rotation to be prevented and with this assembly to be made even easier.

In order to further simplify and accelerate assembly, it is advantageous to widen the transverse dimension of the groove towards its first open end. This creates at the open end an introduction aid which makes it easier to position the aircraft interior equipment component when introducing the sliding block into the groove, whereby the assembly time and therefore assembly costs can be further reduced.

The sliding block may also be part of a damping device. As an aircraft may be subject to significant shocks, in particular upon take-off and landing, but also during flight, it is of advantage to transmit shocks of this kind to the aircraft interior equipment components to the least possible extent through the use of the damping device. As a result, the mechanical load on the aircraft interior equipment components can advantageously be reduced and comfort for the passengers improved, for example by lowering the noise level in the aircraft cabin. In addition, fragile objects, as may be stored in a luggage rack compartment, for example, can be protected against the harmful effect of a shock of this kind. The damping can be further improved by integrating the circular recess into a damping device.

The above-mentioned embodiments can be supplemented in an advantageous manner by a setting screw 31 which is fitted as a spindle screw in the bottom 36 of the circular recess substantially parallel to the longitudinal axis of the sliding block as illustrated in FIG. 3. The spindle screw affords a stop for the sliding block. The sliding block can as a result abut against the setting screw 31 in its arrested position, whereby axial forces can be transmitted to the aircraft structure substantially parallel to the axis of the sliding block. On the one hand this offers the advantage of a precision adjustment facility for the position of the component in the longitudinal direction of the aircraft. On the other hand the aircraft interior equipment component can as a result transmit forces to the aircraft structure in all three directions of space via the fastening device. This can lead to a reduction in the necessary number of suspension points.

A further aspect relates to the configuration of the groove. For example, the groove can have a bottom on one side and the sliding block can abut against the groove bottom. As a result, forces can also be transmitted in the longitudinal direction of the aircraft while simultaneously simplifying the fastening device.

According to a further alternative aspect, the sliding block and the circular recess can form a movable bearing. For this purpose, for example, the circular recess can be open on both sides, so that the sliding block cannot absorb any forces along its axis. This can be used in an advantageous manner to compensate for tolerances when manufacturing the aircraft interior equipment component or during assembly.

As an alternative to this, the groove and the circular recess of a fastening device according to the invention can have, at least at two opposite suspension points, a groove bottom against which the sliding block abuts to form the fixed bearing.

These and other features of the invention will become clearer from the following description of embodiments of a fastening device according to the invention for an aircraft interior equipment component which is given with reference to the accompanying drawings, in which:

FIGS. 2 and 3 show portions of a first embodiment of a fastening device according to the invention;

FIG. 4 shows the embodiment of FIGS. 2 and 3 in the engaged state; and

FIG. 5 shows a further embodiment of a fastening device according to the invention which is in the form of a movable bearing.

Figure 1:
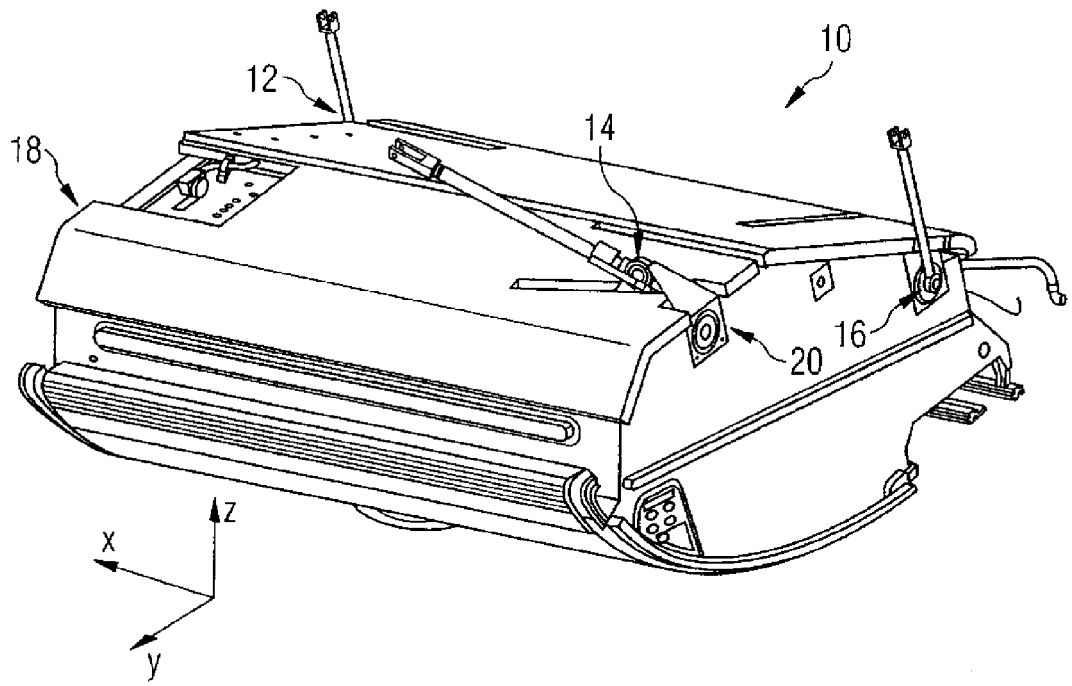
FIG. 1 shows a luggage rack compartment according to the prior art as an example of an aircraft interior equipment component in a perspective view.

A conventional luggage rack compartment, which is generally marked by 10, as is provided for assembly in an overhead position in a passenger aircraft, is represented three-dimensionally in FIG. 1. This luggage rack compartment serves as a non-restrictive example of an aircraft interior equipment component. The luggage rack compartment 10 which is represented in FIG. 1 is connected to the aircraft structure at five suspension points 12 to 20 using several further components, including bolt fastening elements and tension/compression rods. Only forces in one direction in space can be transmitted through the tension/compression rods.

Figure 2:
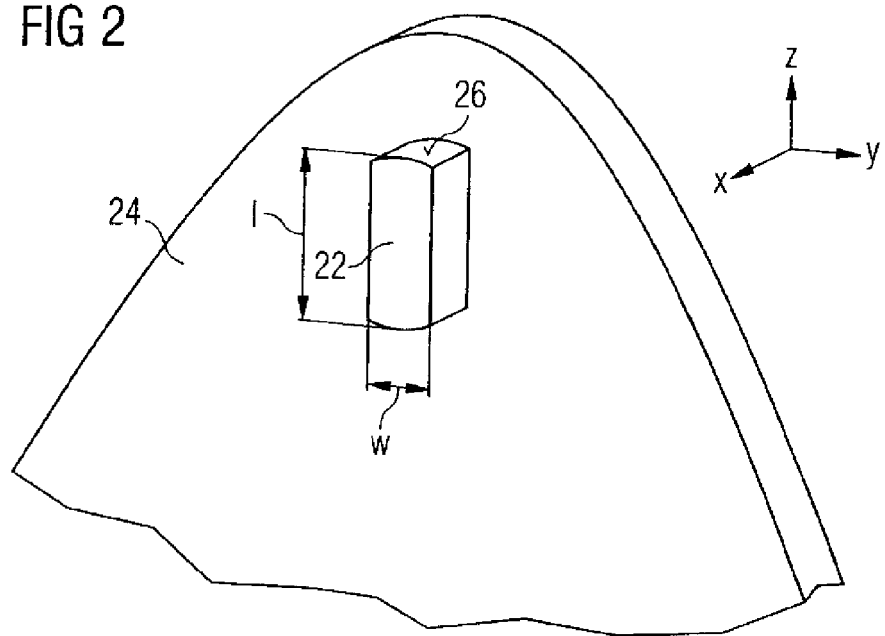

In contrast, FIGS. 2 to 4 show a fastening device 11 according to the invention for an aircraft interior equipment component which does not require any additional loose parts. In the portion of the embodiment which is shown in FIG. 2 a sliding block 22 is applied to an aircraft interior equipment component 24. The sliding block 22 has a transverse dimension w, a longitudinal dimension l as well as rounded ends 26 which represent segments of a cylindrical surface.

FIG. 3 shows a groove 28 which is applied to a holding structure 30 and is open on one side. The groove 28 has a transverse dimension W and a first open end 34 and a second end which leads into a circular recess 32. The groove 28 widens towards its open end 34 and forms an introduction aid. In this embodiment the transverse dimension w of the sliding block 22 which is shown in FIG. 2 is approximately one tenth of a mm smaller than the transverse dimension W of the groove 28.

For assembly the aircraft interior equipment component 24 is raised in order to apply the sliding block 22 to the open end 34 of the groove 28. A first pivotal movement of the aircraft interior equipment component 24 orients the sliding block 22, which is fastened thereto, parallel to the groove 28. Light pressure causes the aircraft interior equipment component 24 to move, as soon as the appropriate angle of application is reached, and the sliding block 22 slides in the groove 28 from the first open end 34 in the direction of the circular recess 32. As soon as the sliding block 22 has penetrated completely into the circular recess 32, the sliding block 22 can be rotated in the circular recess 32 through a second pivotal movement of the aircraft interior equipment component 24. The ends 26 of the sliding block 22 then slide over the inner surfaces of the circular recess 32. For this purpose the ends 26 are rounded with a rounding radius which is the same as the radius of curvature of the circular recess 32. As the longitudinal dimension l of the sliding block 22 is greater than the transverse dimension W of the groove 28, a positive engagement in the circular recess 32 is obtained when the sliding block 22 is in the rotated position. As a result, forces oriented substantially parallel to the plane of rotation, which is spanned by the directions Y and Z shown in FIG. 2, can be transmitted from the sliding block 22 to the holding structure 30 both in the Y and in the Z direction.

Furthermore, the height of the sliding block 22 is selected so that this abuts against a bottom 36 of the groove 28. Additional forces can as a result also be transmitted in the X direction.

FIG. 4 shows the fastening device 11 for an aircraft interior equipment component 24 when arrested in the holding structure 30. An adjustment device (not shown) is provided at the holding structure 30 in order to precisely adjust the position of the aircraft interior equipment component 24. In addition to the fastening device 11 which is shown in FIG. 4, a further fastening device 11 is applied in mirror-image fashion at a suspension point lying opposite in the X direction. The sliding block 22 is as a result prevented from escaping from the groove 28 or the circular recess 32 in the X direction. Due to the adjustment device of the holding structure 30 in the X direction, a bias in the X direction can be built up between the two above-mentioned opposite fastening devices 11, whereby an additional non-positive (force fit) engagement is obtained. A fixed bearing can also be formed by the opposite suspension points.

In this embodiment, by inserting the sliding block 22 in the groove 28 and pivoting the aircraft interior equipment component 24, the assembly of the aircraft interior equipment component 24 in relation to the two above-mentioned suspension points is essentially completed when the sliding block 22 has completely entered the recess 32. This represents a significant facilitation of the assembly of the aircraft interior equipment component 24 with respect to the prior art, as no loose locking elements have to be fastened to the suspension point while the aircraft interior equipment component is held in position.

According to a further embodiment, it is possible to dispense with the adjustment facility of the holding structure 30 in the X direction by fitting a spindle screw (not shown), which extends in the X direction, in the circular recess. For this purpose the spindle screw meshes with a thread which is formed in the bottom of the circular recess 32. The spindle screw is accessible from the back of the holding structure 30 and has the function of a setting screw in the X direction. The spindle screw is screwed in during assembly to an extent such that its end abuts against the sliding block 22. Forces which act in the X direction can as a result be transmitted from the sliding block 22 to the holding structure 30. The positive engagement of the fastening device according to the invention can in addition thus be advantageously supplemented by a non-positive (force locking) engagement. Furthermore, tolerances which arise when manufacturing the aircraft interior equipment component or during assembly can be compensated in a simple manner by the spindle screw.

All the above-mentioned embodiments can be used to transmit forces to the aircraft structure in all three directions in space. This is of advantage when compared with a conventional fastening of an aircraft interior equipment component which requires separate suspension points for the transmission of X forces or Y/Z forces. The fastening device according to the invention thus makes it possible to dispense with an X suspension point.

According to an alternative embodiment which is represented in FIG. 5, the groove 28 and the circular recess 32 are open on both sides. As a result, a translational degree of freedom in the X direction remains for the sliding block 22. The sliding block 22 and the circular recess 32 thus form a movable bearing which is generally marked by 38 in FIG. 5. This can compensate for tolerances in the X direction during assembly.

In all the above-mentioned embodiments it is of advantage to mount the circular recess 32 in a damped manner. The movable bearing 38 which is shown in FIG. 5 therefore has a damping outer ring 40. According to a further embodiment, which is not shown, the sliding block 22 is part of a damping device. Shocks which occur in particular upon landing and take-off are transmitted in a damped manner to the aircraft interior equipment component 24 through this damping device. As a result, the mechanical load on the aircraft interior equipment component 24 is distinctly reduced, percussive noises are prevented and flight comfort is increased.

All aircraft interior equipment components which are conceivable for the person skilled in the art, for example also supply modules, can be fastened by using the fastening component 11 according to the invention.

The invention claimed is:

1. A fastening device for transmitting forces from an aircraft interior equipment component to a holding structure of an aircraft in at least one direction, the fastening device comprising:
   a circular recess defining an inner surface that extends perpendicularly from a bottom surface,
   a groove having a pair of parallel faces that extend perpendicularly from the bottom surface and outside the inner surface defined by the circular recess, the parallel faces being spaced apart by a transverse dimension, the groove having an open end and an opposite end defining an opening through the inner surface into the circular recess, and
   a sliding block having a longitudinal dimension and a transverse dimension that is smaller than the longitudinal dimension and smaller than or equal to the transverse dimension of the groove so that the sliding block can be longitudinally advanced through the groove and into the circular recess,
   wherein the longitudinal dimension of the sliding block defines first and second opposite ends which each positively engage the inner surface of the circular recess when the sliding block is rotated within the circular recess,
   wherein the parallel faces of the groove extend away from the inner surface of the circular recess in a direction normal to an axis of rotation of the sliding block within the circular recess,
   and wherein a thread is formed in the bottom surface of the circular recess, a setting screw is fitted in the circular recess, so that the screw meshes with the thread formed in the bottom of the circular recess, and the sliding block abuts against the setting screw.

2. The fastening device according to claim 1 wherein the first and second ends of the sliding block are rounded,
   and wherein the first and second rounded ends each define a rounding radius which is substantially equal to a radius of curvature of the circular recess.

3. The fastening device according to claim 1, further comprising an introduction aid portion at the open end of the groove, the groove leading to the introduction aid portion, wherein the transverse dimension increases in the introduction aid portion towards its open end.

4. The fastening device according to claim 1 wherein the sliding block and the circular recess form a movable bearing.

5. The fastening device according to claim 4 wherein the circular recess of the movable bearing is formed in a damping outer ring.

6. The fastening device according to claim 1 wherein the first and second ends of the sliding block are rounded,
   and wherein the first and second rounded ends each define a rounding radius which is smaller than a radius of curvature of the inner surface of the circular recess.

7. The fastening device of claim 1
   wherein the inner surface and the parallel faces have equal height in a direction parallel to the axis of rotation.

8. The fastening device according to claim 7 wherein the first and second ends of the sliding block are rounded,
   and wherein the first and second rounded ends each define a rounding radius which is substantially equal to a radius of curvature of the inner surface of the circular recess.

9. The fastening device according to claim 7, further comprising an introduction aid portion at the open end of the groove, the groove leading into the introduction aid portion, wherein the transverse dimension increases in the introduction aid portion towards its open end.

10. The fastening device according to claim 7 wherein the circular recess defines a bottom surface, the inner surface defined by the circular recess extends perpendicularly from the bottom surface,
   and further comprising a setting screw fitted in the bottom surface of the circular recess such that the sliding block abuts against the setting screw.

11. The fastening device according to claim 7 wherein the sliding block and the circular recess form a movable bearing.

12. The fastening device according to claim 7 where the first and second ends of the sliding block are rounded,
   and wherein the first and second rounded ends each define a rounding radius which is smaller than a radius of curvature of the inner surface of the circular recess.

13. In combination:
   a holding structure of an aircraft,
   an aircraft interior equipment component, and
   a fastening device formed to transmit forces to the holding structure in at least one direction, the fastening device comprising a circular recess defining an inner surface that extends perpendicularly from a bottom surface, a groove having a pair of parallel faces that extend perpendicularly from the bottom surface and outside the inner surface defined by the circular recess, the parallel faces being spaced apart by a transverse dimension, the groove having an open end and an opposite end defining an opening through the inner surface into the circular recess, wherein the circular recess and the groove are fitted to one of the holding structure and the aircraft interior component, and a sliding block fitted to the other of the holding structure and the aircraft interior component, the sliding block having a longitudinal dimension and a transverse dimension that is smaller than the longitudinal dimension and smaller than or equal to the transverse dimension of the groove so that the sliding block can be longitudinally advanced through the groove and into the circular recess, wherein the longitudinal dimension of the sliding block defines first and second opposite ends which each positively engage the inner surface of the circular recess when the sliding block is rotated within the circular recess, and wherein the parallel faces of the groove extend away from the inner surface of the circular recess in a direction normal to an axis of rotation of the sliding block within the circular recess, and wherein a thread is formed in the bottom surface of the circular recess, a setting screw is fitted in the circular recess, so that the screw meshes with the thread formed in the bottom of the circular recess, and the sliding block abuts against the setting screw.

* * * * *